C. C. CLARK.
AGRICULTURAL IMPLEMENT.
APPLICATION FILED OCT. 1, 1915.
1,171,023.
Patented Feb. 8, 1916.
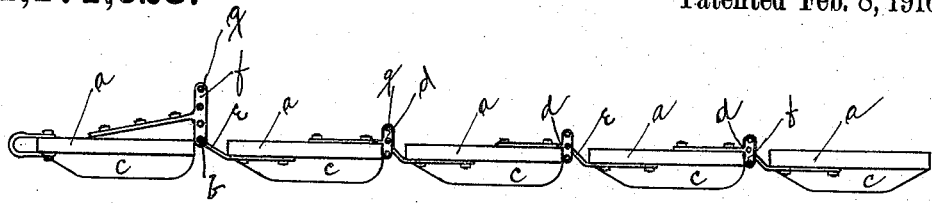
Fig-1-
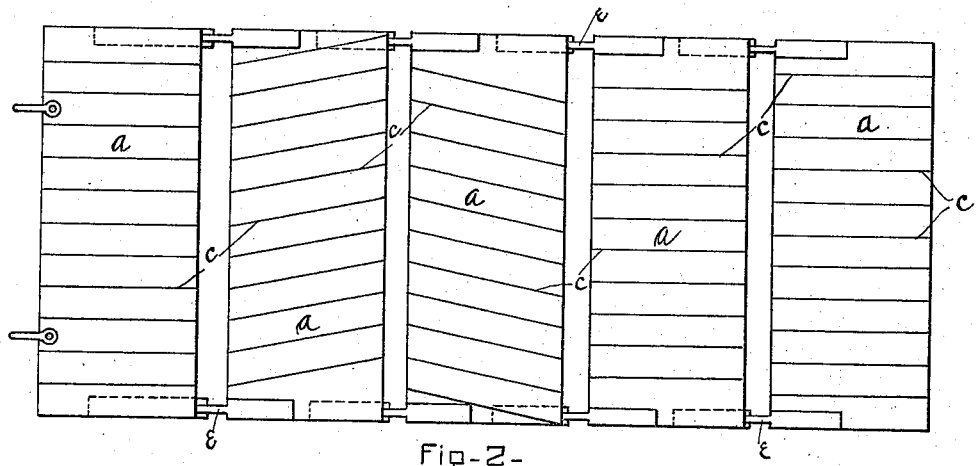
Fig-2-
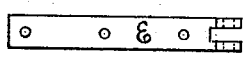
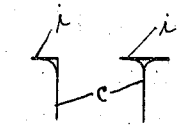
Fig-4-
Fig-3-
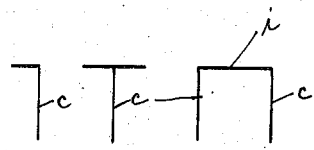
Fig-5-
Witnesses
Agnes A. Johnston
Helen Meeks
Inventor
CYRUS C. CLARK
W.C.Carman
Attorney

UNITED STATES PATENT OFFICE.

CYRUS C. CLARK, OF MARSHALL, WISCONSIN.

AGRICULTURAL IMPLEMENT.

1,171,023.  Specification of Letters Patent.  Patented Feb. 8, 1916.

Application filed October 1, 1915. Serial No. 53,636.

*To all whom it may concern:*

Be it known that I, CYRUS C. CLARK, a citizen of the United States, residing at Marshall, in the county of Dane and State of Wisconsin, have invented certain new and useful Improvements in Agricultural Implements, of which the following is a specification.

This invention relates to agricultural implements and is designed to provide what may be termed a combined harrow, crusher and leveler, of cheap and easy construction, and so constructed as to adapt itself to the varying surfaces or topography of the ground.

With these and other points in view, which will become more apparent as the details of the device are explained, the same consists in the novel construction, combination and arrangement of the various parts hereinafter fully described, illustrated and claimed.

In the accompanying drawings, Figure 1 is a side elevation of my device. Fig. 2 is a bottom plan view showing how the agitating blades may be arranged in various relations; Fig. 3 shows in detail the adjustable and flexible connection device; Fig. 4 shows a modification in the form of blade, the same having a concave working face; and Fig. 5 shows various ways in which the agitating blades may be formed.

Similar reference characters designate corresponding parts throughout the several figures of the drawings.

Primarily, my invention consists of a series of transverse body-pieces or sections $a$, flexibly and adjustably attached or connected one behind the other, as at $b$, and carrying agitating blades $c$.

For the purpose of providing varying flexibility or oscillation, which will permit each individual section of the harrow to adapt itself to the surface of the ground immediately beneath it, I have provided between each pair of contiguous sections a free swinging connection, consisting of the T-shaped connecting members $d$ carried on the rear edge of the section $a$, and the connecting members $e$ carried on the front edge of the section $a$, and designed for engagement with the cross-head portions $f$ of said T-shaped connecting members. And for the purpose of adjusting the angle at which each section rides over the ground I provide the upright or cross-head portions $f$ of the connecting members $d$ with a series of holes $g$ for the engagement of the connecting members $e$. I do not, however, desire to be understood as limiting myself to this particular method of construction, as it is clear that other equivalent connections may be used.

To the under surface of each body-piece $a$, I attach agitating blades $c$, running transversely of the section but longitudinally, or substantially so, with the operating direction of the implement, the blades on some of the body-pieces being secured in a direct transverse relation, while upon others, they are secured in varying reverse angular relation, for the purpose of giving the soil alternating lateral movements, as hereinbefore explained.

As the implement is drawn over the ground, the first action will be the crushing or planking effect, and a longitudinal cutting by the blades. The second action, as shown in applicant's arrangement, Fig. 2, will be similar in effect, except that the blades, being set in angular relation, will gradually move the soil to the left, leaving it in more or less ridged formation. The third action will be exactly similar to the second, except that the blades will cut substantially cross-wise of the ridges left by the preceding operation, and the soil will be moved laterally in the opposite direction. The fourth action, as applicant has arranged his blades, will be similar to the first, except that the blades will in this case cut the ridges left by the preceding action in an angular direction, while the fifth and last action will be similar to the first, the blades being so arranged as to engage the soil alternately between the cuts made by the preceding action.

The agitating blades $c$ may, of course, be shaped in various forms such, for instance, as angle iron, T-head or channel iron, any one of which affords a suitable attaching base $i$, while in the latter the blades will be formed integrally in pairs. A modified form of the working part of the agitating blade is shown in Fig. 4, wherein it is provided with a single or double concave working side. The implement may be provided with any suitable well known draft appliances.

In order to give the implement a transverse flexible or oscillating action, it is obvious that two or more longitudinal sections may be attached side by side by any suitable flexible connection.

It will be obvious that my invention is susceptible of certain changes in details without departing from the spirit or scope of the invention.

I claim:

1. In an agricultural implement, a plurality of transverse sections flexibly connected one behind the other, each of said sections carrying a series of agitating blades, the blades on some of the sections being arranged transversely thereto and on others in reverse and varying angle relation thereto, and draft attachments.

2. In an agricultural implement, a plurality of transverse sections flexibly and adjustably connected one behind the other, each of said sections carrying a series of agitating blades, the blades on some of the sections being arranged transversely thereto and on others in reverse and varying angle relation thereto, and draft attachments.

3. In an agricultural implement, a plurality of transverse sections flexibly connected one behind the other, each of said sections carrying a series of agitating blades having concave working faces, the blades on some of the sections being arranged transversely thereto and on the others in reverse and varying angle relation thereto, and draft attachments.

4. In an agricultural implement, a plurality of transverse sections flexibly and adjustably connected one behind the other, each of said sections carrying a series of agitating blades having concave working faces, the blades on some of the sections being arranged transversely thereto and on others at reverse and varying angle relation and draft attachments.

5. In an agricultural implement, a plurality of transverse sections, each section except the rear one being provided at its rear edge with T-shaped connecting members, and also each section except the front one being provided at its front edge with connecting members for engagement with the said T-shaped connecting members; agitating blades attached to the under surface of said sections and arranged in transverse and varying angle relation thereto, and draft attachments.

6. In an agricultural implement, a plurality of transverse sections, each section except the rear one being provided at its rear edge with T-shaped connecting members, and also each section except the front one being provided at its front edge with connecting members for engagement with the said T-shaped connecting members, agitating blades attached to the under surface of said sections, said blades having concave working faces, and being arranged in transverse and reverse and varying angle relation to said body-pieces, and draft attachments.

In testimony whereof I hereunto affix my signature in the presence of two witnesses.

CYRUS C. CLARK.

Witnesses:
JOHN H. McCREDIE,
NELS A. PETERSON.

Copies of this patent may be obtained for five cents each, by addressing the "Commissioner of Patents Washington, D. C."